May 20, 1969 D. C. LEWIS 3,445,632
THERMOSTAT
Filed July 21, 1967

DWIGHT C. LEWIS INVENTOR.

BY A. J. DeAngelis
ATTORNEY.

United States Patent Office 3,445,632
Patented May 20, 1969

3,445,632
THERMOSTAT
Dwight Charles Lewis, Elkhart, Ind., assignor to Penn Controls, Inc., Oak Brook, Ill., a corporation of Delaware
Filed July 21, 1967, Ser. No. 655,050
Int. Cl. H05b 1/02
U.S. Cl. 219—511                                    6 Claims

ABSTRACT OF THE DISCLOSURE

Power is supplied to the anticipating heater of a thermostat by a saturating current transformer, thereby keeping the anticipating heat supplied substantially constant throughout a wide variation of the load controlled by the thermostat and minimizing the effect of fluctuations in the line voltage. The electrical resistance of a portion of the thermostat's temperature responsive element itself serves as the anticipating heater to which power is supplied through the transformer.

---

Figure 1:
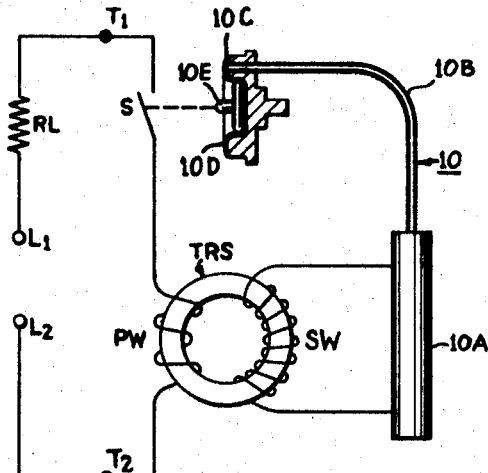

The invention relates to thermostatic controls and more particularly to thermostats having heat anticipating means.

In present day heating installations, the thermostat is equipped internally with an electrical resistor which applies a predetermined small amount of heat to the thermo-responsive element of the thermostat during the time that the thermostat is in the "on" condition. This small amount of heat causes the thermostat to anticipate the need to shut off the heat supply. This tends to minimize "over-shoot" past the thermostat's desired set point and narrows the operating differential.

However, in thermostatic controls for heating, when the outside temperature drops, the "on" time of the thermostat is increased to overcome the added heat loss of the space being heated. As the thermostat is actuated to its "on" condition, current flow in the thermostat switching elements also generates heat termed "internal heat," causing the temperature of the thermo-responsive element of the thermostat to rise. This "internal heat" supplements the heat generated by the anticipating heater which is energized during the "on" time of the thermostat. The thermo-responsive element, thus, responds to this combined "anticipating heat" and to the temperature of the space being heated to "cut off" power to the load.

After a time, depending upon the amount of internal heating and the rate of heat loss from the thermostat, the thermostat is again actuated "on" by its thermo-responsive element. The thermostat, thus, fluctuates on and off depending on the amount of internal heating, the thermostat thermo mass, and the heat transfer rate to the surroundings, until a timing cycle is attained with dynamic balance between the heat gains and losses.

With increases in heat load requirements the "on" time of the thermostat increases and consequently the amount of anticipating heat increases. This results in a drop in room temperature below that of the thermostat set point. This drop or differential between the thermostat set point and the maintained temperature of the space being heated is termed "droop" and normally increases with greater loads.

Increased droop with increases in the heating requirements is especially pronounced in thermostats operating with relatively high currents through their switching contacts. For example, line voltage thermostats controlling electric resistance heaters. With such thermostats, the heat anticipators are either directly energized by load current with consequent undesirable high heat generation, or else at a portion thereof by means of a shunt resistor which itself generates considerable internal heat.

It is, therefore, an object of the invention to provide a thermostat in which the anticipating heat is minimized to just the amount required to attain a narrow thermostat differential.

It is a further object to provide heat anticipation which is substantially constant at all operating loads.

The invention involves providing, in a thermostat for controlling energization of a load from an alternating power source, a saturating current transformer for supplying power to an anticipating heater during the "on" time of the thermostat. The transformer thermally isolates the heater from the thermostat switching elements, while electrically coupling the heater thereto. The transformer magnetically saturates at a relatively low load current, causing the current supplied to the anticipating heater to remain substantially constant for larger values of load current, thereby, providing anticipating heat at a constant rate. The thermo-responsive element is constructed of material having a relatively high electrical resistance and is connected as a resistor across the secondary windings of the saturating transformer which matches this resistance value. The current through the thermo-responsive element generates just enough anticipating heat to end the "on" part of the thermostat switching cycle to anticipate the need to shut off the heat supplied by the heating plant within a narrow differential.

Features and advantages of the invention will be seen from the above, from the following description of the preferred embodiment when considered in conjunction with the drawing and from the appended claims.

Figure 2:
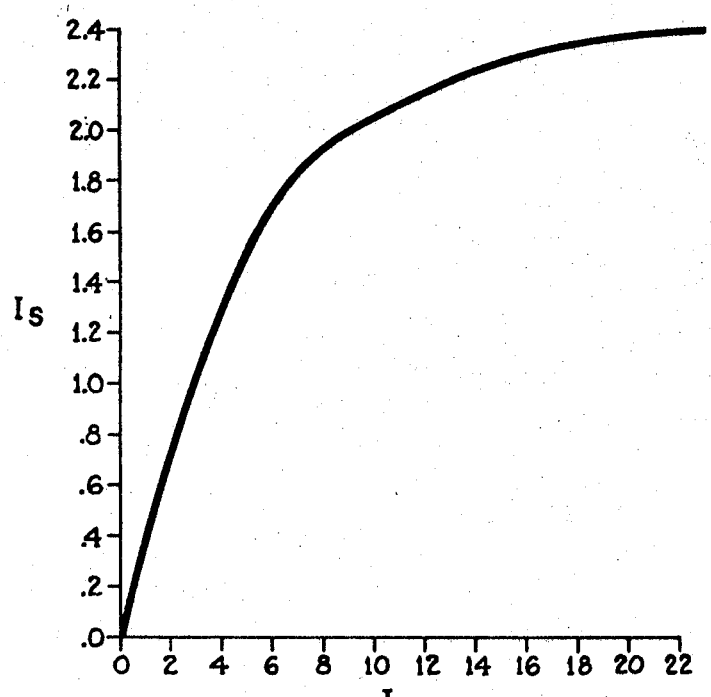

In the drawing:

FIG. 1 is a simplified diagrammatic view of a thermostat for controlling power supplied to an electrical resistor from an alternating power source and includes a schematic wiring diagram of the power circuit and the anticipating heating means circuit, embodying the invention; and FIG. 2 is a graph of the primary current versus the secondary current for the saturating current transformer, designated TRS in FIG. 1.

Referring to FIG. 1, wherein a preferred embodiment of the thermostat is illustrated for controlling power to an electrical load, designated RL, for supplying heat to a room monitored by the thermostat. Alternating power from any convenient source (not shown) is supplied over lines L1, L2 to load RL which is connected through thermostat terminals T1, T2 in series with normally open thermostat switching contacts, designated S, and the primary windings PW of a transformer TRS. Transformer TRS is provided with secondary windings SW connected across the bulb portion 10A of a thermo-responsive element, generally designated 10.

It is to be understood that, thermo-responsive element 10 may be of any convenient type, such as bimetal or charged element, but is shown here as being of the charged bulb type.

Element 10 comprises a bulb 10A connected through capillary tubing 10B to a chamber 10C. Chamber 10C, tubing 10B and bulb 10A are filled with a fluid which expands with increases in temperature. One side of chamber 10C is formed of a flexible diaphragm 10D upon which an actuation pin 10E is mounted for movement therewith.

With bulb 10A located in the room being heated the temperature therein is sensed by the fluid charge in the bulb. Variations in the sensed temperature cause corresponding variations in the volume of the fluid contained in the closed system. Thus, a decrease in temperature sensed by bulb 10A, causes a decrease in the volume of the fluid charge. This causes diaphragm 10D to move to the right, carrying actuating pin 10E also the right. Pin 10E is mechanically coupled to thermostat switch contacts S, as is indicated by the broken line connection thereto.

Assume a decrease in sensed temperature to below a predetermined set point of the thermostat. This causes pin 10E to move to the right, actuating contacts S closed. A sensed increase in temperature above the thermostat set point causes diaphragm 10D to move to the left, re-opening thermostat contacts S. The thermostat, thus, through its switch contacts S causes heating load RL to be energized within a predetermined thermostat differential from the alternatnig power source (not shown) over supply lines L1, L2. Load RL, during energization, supplies heat to the room being monitored by bulb 10A to maintain the temperature therein within a desired range.

In one tested embodiment, bulb 10A was formed of type 304 stainless steel with an inside diameter of ⅜ inch and a wall thickness of .01 inch. Bulb 10A was connected across secondary windings SW of a transformer TRS to provide an anticipating heater ressitance of .0103 ohm. Transformer TRS was selected with primary windings PW of three turns of 10 gauge copper wire. Secondary windings SW was selected of seven turns of 16 gauge copper wire. The transformer is designed to provide a predetermined current in the anticipating resistance of bulb 10A by magnetically saturating at relatively low currents in the primary circuit to provide substantially constant heat anticipated in the thermostat throughout a wide range of load current and fluctuations in the line voltage applied to load RL.

The characteristics of this saturating current transformer for the tested embodiment is shown in the graph of FIG. 2. The graph vertical or Y axis is designated IS against which is plotted the current, in amperes, flowing in the secondary windings SW, while the horizontal or X axis is designated IP against which is ploited the current, in amperes, flowing in primary windings PW. It may be seen that for a change in current through electrical resistance load RL from 10 to 22 amperes in the circuit of primary winding PW, a 120% increase, the secondary current changes only approximately 17% and the watts dissipated in bulb 10A increase by 37% from .04 watt to .057 watt. With a current at 2.25 amperes passing through bulb 10A, .05 watt of heat are provided for heat anticipation. Due to the highly efficient electrical coupling which transformer TRS provides for applying energy to the anticipating heater bulb 10A, while it provides thermo isolation of the bulb anticipating heater from the thermostat switching circuit, bulb 10A generates just enough heat during the "on" part of the switching cycle of the thermostat to anticipate the need to shut off the heat and narrow the operating differential of the thermostat.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:
1. In the thermostat for controlling power supplied to a load in accordance with variations in temperature at a location where heat is provided in accordance with operation of said load, the combination comprising,
   electrical switching means for interconnecting said load to an alternating power source for energization therefrom.
   temperature responsive means responsive to the temperature at said location for actuating said switching means in accordance with changes in temperature from a predetermined desired temperature,
   anticipating means responsive to energization of said load for applying heat to said temperature responsive means,
   characterized in that there is provided,
   a transformer having primary windings interconnectable by said switching means to said power source for energization by said power source simultaneously with said load upon actuation of said switch.
   and having secondary windings interconnected to said anticipating means for energization thereof through said transformer.
2. A thermostat as set forth in claim 1 wherein said tansformer magnetically saturates for maintaining energization of said anticipating means substantially constant throughout the range of energization of said load.
3. A thermostat as set forth in claim 1 wherein said temperature responsive means also functions as said anticipating heating means.
4. A thermostat as set forth in claim 1 wherein said anticipating means interconnected for energization through said secondary winding of said transformer is the electrical resistance of at least a portion of said temperature responsive means.
5. A thermostat as set forth in claim 1 wherein said temperature responsive means is a charged element and said anticipating heating means is the electrical resistance of at least a portion of said charaged element.
6. A thermostat as set forth in claim 1 wherein said temperature responsive means is a bimetal and wherein said anticipating heating means is at least a predetermined portion of said bimetal having a certain electrical resistance.

References Cited

UNITED STATES PATENTS 2,593,214  4/1952  Stroup _____ 219—511

BERNARD A. GILHEANY, *Primary Examiner.*

F. E. BELL, *Assistant Examiner.*

U.S. Cl. X.R.

219—513; 335—106